(12) United States Patent
Belmonte et al.

(10) Patent No.: US 9,903,375 B2
(45) Date of Patent: Feb. 27, 2018

(54) SYSTEM FOR HOLDING BLADES AND ASSEMBLY METHOD

(71) Applicant: SNECMA, Paris (FR)

(72) Inventors: Olivier Belmonte, Perthes en Gatinais (FR); Augustin Curlier, Melun (FR)

(73) Assignee: SNECMA, Paris (FR)

( * ) Notice: Subject to any disclaimer, the term of this patent is extended or adjusted under 35 U.S.C. 154(b) by 184 days.

(21) Appl. No.: 14/430,729

(22) PCT Filed: Sep. 18, 2013

(86) PCT No.: PCT/FR2013/052154
§ 371 (c)(1),
(2) Date: Mar. 24, 2015

(87) PCT Pub. No.: WO2014/044970
PCT Pub. Date: Mar. 27, 2014

(65) Prior Publication Data
US 2015/0204339 A1    Jul. 23, 2015

(30) Foreign Application Priority Data
Sep. 24, 2012 (FR) .......................... 12 58950

(51) Int. Cl.
*F04D 19/02* (2006.01)
*F04D 27/00* (2006.01)
(Continued)

(52) U.S. Cl.
CPC ............ *F04D 19/024* (2013.01); *B64C 11/06* (2013.01); *F02K 3/072* (2013.01); *F04D 19/002* (2013.01);
(Continued)

(58) Field of Classification Search
CPC .... F04D 19/024; F04D 19/002; F04D 27/002; F04D 29/323; F04D 29/322; B64C 11/06;
(Continued)

(56) References Cited

U.S. PATENT DOCUMENTS 3,303,889 A * 2/1967 Bates ...................... B64C 11/04
                                                                416/204 R
3,860,361 A    1/1975 McMurtry et al.
(Continued)

FOREIGN PATENT DOCUMENTS

DE    40 15 207 C1    10/1991
FR    2 192 626 A5    2/1974
(Continued)

OTHER PUBLICATIONS

French Preliminary Search Report dated Jun. 17, 2013 in Patent Application No. FR1258950 (with English Translation of Category of Cited Documents).
(Continued)

*Primary Examiner* — Woody Lee, Jr.
*Assistant Examiner* — Eric Zamora Alvarez
(74) *Attorney, Agent, or Firm* — Oblon, McClelland, Maier & Neustadt, L.L.P.

(57) ABSTRACT

A fan including a system for holding blades having variable pitch, in which the bases of the blades are mounted onto radial shafts of a rotor of the fan by pivots, is provided. The system includes a main body capable of being attached onto the rotor; and at least one holding arm mounted onto the main body and capable of extending inside a pivot so as to engage with the pivot in order to lock the movement of the pivot along the axis of the shaft on which the holding arm is mounted.

11 Claims, 8 Drawing Sheets

(51) Int. Cl.
*F04D 19/00* (2006.01)
*F04D 29/32* (2006.01)
*F02K 3/072* (2006.01)
*B64C 11/06* (2006.01)
*B64D 27/00* (2006.01)

(52) U.S. Cl.
CPC ......... *F04D 27/002* (2013.01); *F04D 29/323* (2013.01); *B64D 2027/005* (2013.01); *Y02T 50/66* (2013.01); *Y10T 29/49321* (2015.01)

(58) Field of Classification Search
CPC ..... B64C 2027/005; F02K 3/072; F01D 5/30; F01D 5/32; F16B 13/0833
USPC .................................................. 411/340, 344
See application file for complete search history.

(56) References Cited

U.S. PATENT DOCUMENTS

| | | | | |
|---|---|---|---|---|
| 4,863,352 A | * | 9/1989 | Hauser | B64C 11/06 416/129 |
| 5,154,372 A | * | 10/1992 | Hora | F01D 1/24 244/62 |
| 5,242,265 A | * | 9/1993 | Hora | B64C 11/32 416/129 |
| 5,263,898 A | * | 11/1993 | Elston, III | B64C 11/06 416/129 |
| 8,801,384 B2 | * | 8/2014 | Fabre | B64C 11/06 416/219 R |
| 2011/0110781 A1 | * | 5/2011 | Dao | B64C 11/06 416/205 |
| 2012/0070290 A1 | | 3/2012 | Balk et al. | |
| 2012/0121417 A1 | | 5/2012 | Lafont | |
| 2012/0134822 A1 | | 5/2012 | Boston et al. | |

FOREIGN PATENT DOCUMENTS

| | | |
|---|---|---|
| FR | 2 946 012 A1 | 12/2010 |
| FR | 2 948 425 A1 | 1/2011 |
| FR | 2 948 973 A1 | 2/2011 |
| GB | 2 192 943 A | 1/1988 |

OTHER PUBLICATIONS

International Search Report and Written Opinion dated Jan. 15, 2014 in PCT/FR2013/052154 (with English Translation of Category of Cited Documents).
International Search Report dated Jan. 15, 2014 in PCT/FR2013/052154 Filed Sep. 18, 2013.

* cited by examiner

SYSTEM FOR HOLDING BLADES AND ASSEMBLY METHOD

FIELD OF THE INVENTION

The invention relates to a system for holding blades of a fan. The invention also relates to a fan, and a turbine engine.

STATE OF THE PRIOR ART

Certain turbine engines are of the "open rotor" or "unducted fan" type.

The fan of a turbine engine of this type typically comprises two external coaxial and contra-rotating propellers, respectively upstream and downstream, which are each driven in rotation and which extend substantially radially outside the nacelle of said turbine engine.

Each propeller comprises a plurality of blades driven in rotation by a rotor around the axis of the turbine engine.

The foot of each blade is housed in a pivot. A radial shaft makes it possible to rotate the pivot around the axis of the shaft on which it is mounted, in order to induce a rotation of the blade around its axis, which makes it possible to modify its pitch angle.

The pivots are for their part mounted in an axis-symmetric ring having a plurality of substantially cylindrical radial housings, said ring being commonly called polygonal ring.

Unlike conventional turbine engines, turbine engines of the "open rotor" type do not have a casing at the periphery of the blades. Consequently, if the blade is detached from the turbine engine, the blade risks damaging the turbine engine, and more generally, the aircraft which has the turbine engine on board.

DESCRIPTION OF THE INVENTION

The invention proposes a system for holding blades with variable pitch angle, the feet of which are mounted onto the radial shafts of a rotor of a fan by means of pivots, characterized in that it comprises a main body capable of being attached onto the rotor and at least one holding arm mounted onto said main body and capable of extending inside a pivot to engage with same in order to lock the movement of said pivot along the axis of the shaft on which it is mounted.

Thus, the holding system makes it possible to hold the blade in the event of failure, while being compact and simple to implement.

According to an embodiment, the main body is an axle, one end of which is configured to enable it to be introduced into a pivot, as well as to receive a part that comprises at least one holding arm and cooperating with said arm to maintain it in place on the axle.

According to an embodiment, the holding system comprises a plurality of holding arms arranged along a different direction.

According to an embodiment, the holding system comprises at least one annular part, capable of being mounted on one end of the main body, and comprising projecting holding arms.

According to an embodiment, the system comprises an elastic ring, and the main body has at least one groove for receiving the annular part, the ring being arranged in the groove so as to retain the annular part along the axis of the main body.

According to an embodiment, the end of the main body comprises projecting lobes, said lobes being capable of engaging on the part comprising the holding arms, so as to rotate it around the axis of the main body.

The invention also relates to a fan and a turbine engine.

The fan comprises, for one or more blades, a holding system as described previously.

According to a possible aspect, the fan comprises a plurality of blades with variable pitch angle each having a foot, a rotor comprising radial shafts, the feet of the blades being mounted onto the radial shafts by means of pivots, and a holding system for one or more blades.

According to a possible aspect, the main body of the holding system is arranged, for each blade, at least partially inside the radial shaft on which the blade is mounted.

The invention also relates to a method of assembling the system for holding blades, characterized in that it comprises the step consisting in introducing the end of the main body and the holding arm inside the pivot via openings provided in the pivot, and engaging the holding arms on the pivot.

The invention offers a simple, compact, and efficient solution for assuring the maintaining of the blades and elements for holding the blades in the event of failure (break, detachment, etc.). Moreover, the invention offers an individualized holding for each blade, which reinforces the efficiency of the system.

DESCRIPTION OF THE FIGURES

Other characteristics and advantages of the invention will become even clearer from the description that follows, which is purely illustrative and non-limiting, and which should be read in comparison with the appended drawings in which.

DETAILED DESCRIPTION

Figure 1:
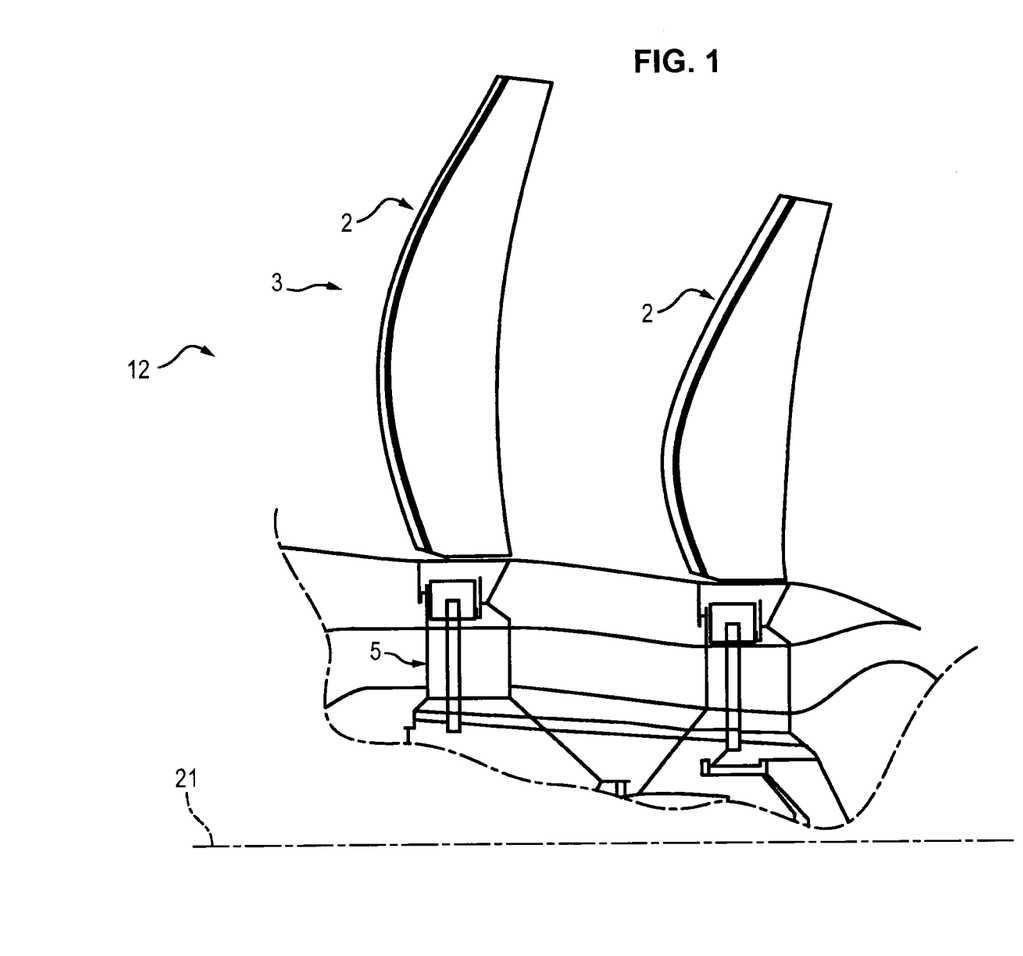
FIG. 1 is a representation of an embodiment of a portion of turbine engine according to the invention.

In FIG. 1 is represented an embodiment of a portion of turbine engine 12 according to the invention. FIGS. 2 to 10 represent different views of embodiments of a system 1 for holding blades 2 of a fan 3.

Fan and Turbine Engine

The fan 3 comprises a rotor 5, for rotating the blades 2 around a longitudinal axis 21 of the fan 3.

In FIG. 1 is represented a portion of turbine engine 12 comprising a fan 3, in which the blades 2 belong to two contra-rotating propellers. It is for example an "open rotor" or "unducted fan" type turbine engine.

Conventionally, a flow of air that penetrates into the turbine engine 12 is compressed then is mixed with the fuel and burnt in a combustion chamber, the combustion gases making it possible to drive in rotation the rotor 5.

The rotor 5 then has a rotational movement around a longitudinal axis 21 of the fan 3, which is transmitted to the blades 2, to rotate them around the longitudinal axis 21.

Figure 2:
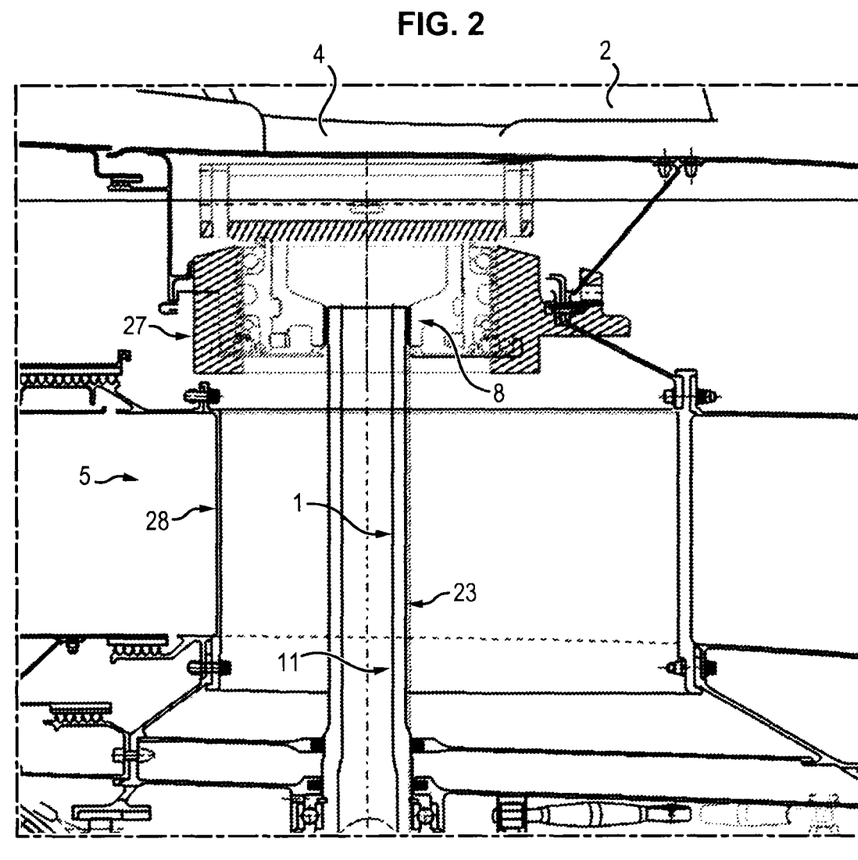
FIG. 2 is a representation of an embodiment of a system for holding blades of a fan, in sectional view.
Figure 3A:
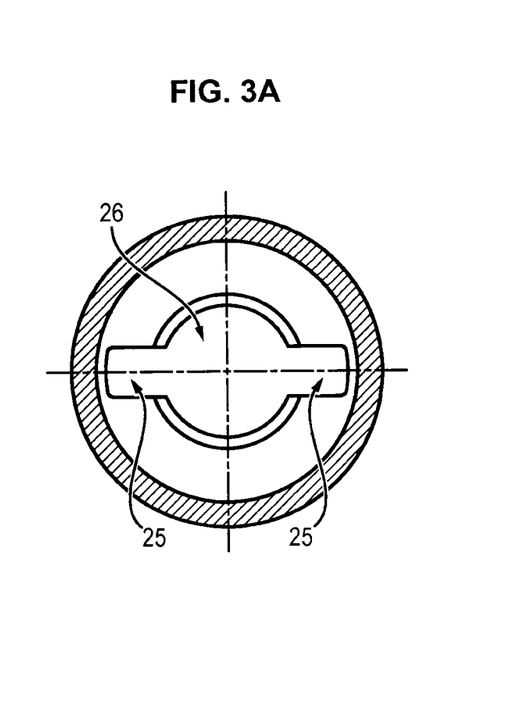
FIGS. 3A and 3B are a partial representation of an embodiment of a pivot intended to interlock with a blade foot, in top view and in facing view.
Figure 3B:
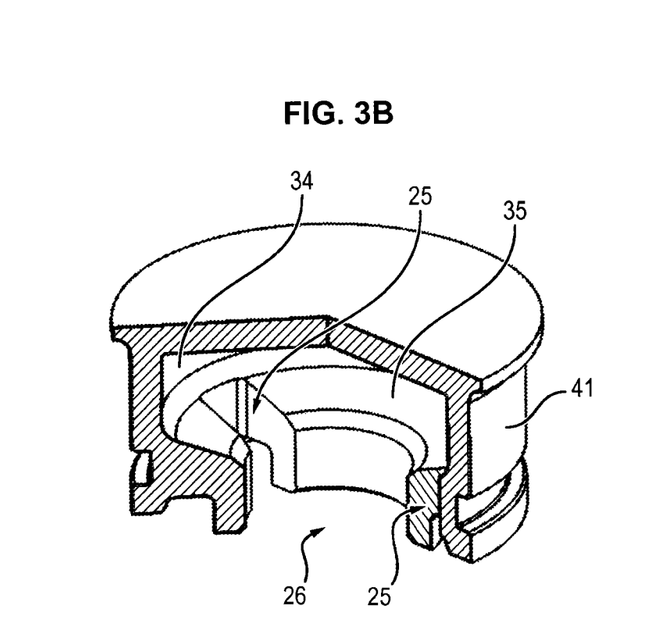
Figure 4:
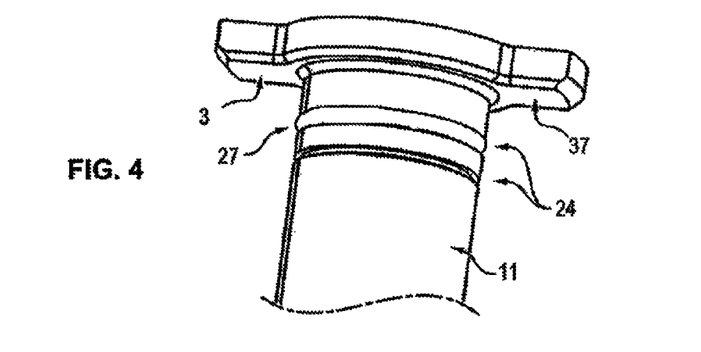
FIG. 4 is a representation of an embodiment of a main body of the holding system according to the invention.

The rotor 5 comprises (cf. FIG. 2) for each blade 2, a radial shaft 23. Conventionally, the foot of the blade is mounted onto the radial shaft 23 by means of a pivot 8. As illustrated in FIGS. 2 and 3, the pivot 8 particularly comprises a cylindrical portion 41 in which a hollowing out 34 has been made.

The fan 3 further comprises a polygonal ring 27 that extends around the longitudinal axis and which comprises a plurality of substantially cylindrical radial housings in which are engaged the pivots 8. The pivots 8 thus also make it possible to maintain the blades in the polygonal ring 27.

In FIG. 2, the rotor 5 comprises a rotating casing 28, into which extends, for each blade 2, the radial shaft 23.

The blades 2 are of the type with variable pitch angle, that is to say that they can turn around their axes so as to optimize their angular position according to the operating conditions of the turbine engine.

The rotation of the radial shaft 23 drives in rotation the pivot 8 around its axis, in its housing in the polygonal ring 27, which makes it possible to produce the rotation of the blade 2 around its axis (parallel to the radial axis of the fan).

The orientation of the radial shaft 23 around its own axis makes it possible to modify the inclination of the blades, that is to say their angle of incidence. It should be noted that the blades of a rotor all have the same pitch angle.

Holding System

The holding system 1 is illustrated with reference to FIGS. 2 to 10.

The holding system 1 comprises a main body 11 capable of being attached onto the rotor 5 and at least one holding arm 19, 20 mounted onto said main body and capable of extending inside a pivot 8 to engage with said pivot 8 in order to lock the movement of said pivot along the axis of the shaft on which it is mounted.

The main body 11 is driven in rotation with the rotor 5.

The holding system 1 makes it possible to retain the pivot 8 of each blade along the radial axis of the fan, which makes it possible to avoid the blades being freed and, boosted by centrifugal forces, do not generate damage around the turbine engine.

In an embodiment, the main body 11 is an axle, one end of which is configured to allow it to be introduced inside the pivot 8. In particular, this end extends into a hollowing out 34 made in the pivot 8. The axle 11 is for example cylindrical and extends along the radial axis of the fan.

The holding arms 19, 20 for their part interlock with the internal wall 35 of the pivot 8, so as to assure the radial locking of the pivot 8.

In an embodiment, one end of the axle 11 receives a part 17, 18 which comprises at least one holding arm. The end of the axle 11 cooperates with the part 17, 18, said part being maintained in place on the axle.

The holding arms are in general projecting onto the part 17, 18, which is itself capable of being fitted around the axle 11. The part 17, 18 is in general annular.

According to an embodiment, the system comprises a plurality of holding arms 19, 20 arranged along a different direction.

For example, the holding system 1 comprises a first part 17 and a second part 18 each comprising holding arms 19, 20 arranged along a different direction, so as to reinforce a radial blocking of the pivot 8. Alternatively, a plurality of these holding arms is arranged on a single part 17, 18.

According to an embodiment, the parts 17, 18 are movable, not just with respect to the axle 11 but also with respect to the pivot 8.

According to an embodiment, each part 17, 18 comprises at least one pair of arms 19, 20 aligned with respect to the centre of the part.

The insertion of the end of the axle 11 and the holding arms 19, 20 inside the pivot 8 comes up against the problem of accessing zones which are difficult to access.

To this end, it is provided that the pivot 8 comprises a central opening 26, and at least one lateral opening 25, enabling the insertion and the extraction of the axle 11 and the holding arms.

These openings 25, 26 may be formed by known machining of a pivot 8, in particular in its lower part, generally cylindrical.

In general, the lateral openings 25 are arranged in an opposite manner with respect to the centre of the pivot 8.

The lateral openings 25 make it possible to let pass the holding arms 19, 20 as well as potential elements projecting from the holding system.

Once inserted inside the pivot, the parts 17,18 are moved so as to recover an assembly position in which said parts are locked and cannot spontaneously come out of the pivot.

When the first and the second 17, 18 parts are positioned inside the pivot 8, the holding arms 19 of the first part 17 are in general arranged along a different direction to the holding arms 20 of the second part 18, so as to assure a radial locking of the pivot 8.

Figure 9A:
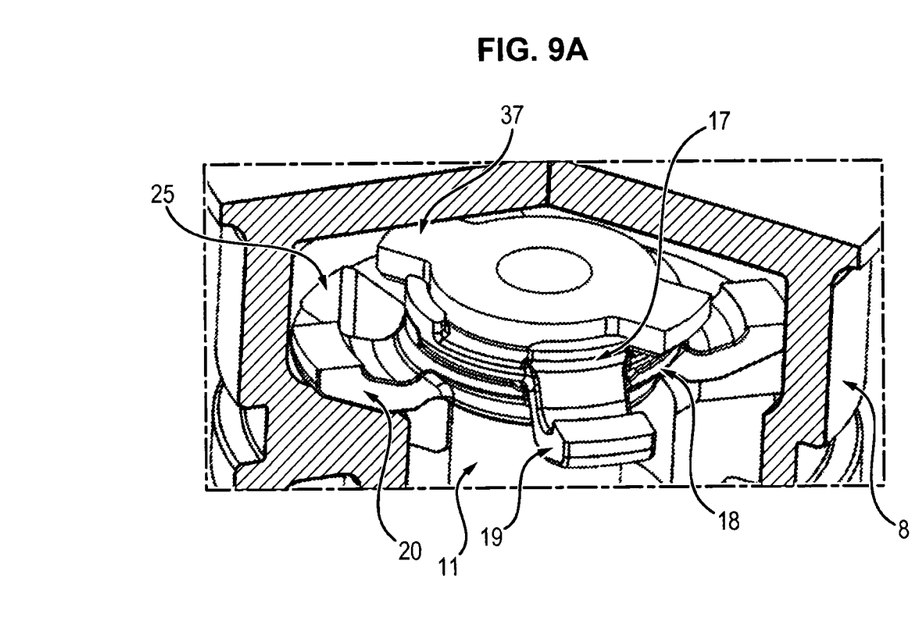
FIGS. 9A and 9B represent an embodiment of the putting in place of the holding system, as well as a top view illustrating a cross-shaped arrangement of the holding arms.
Figure 9B:
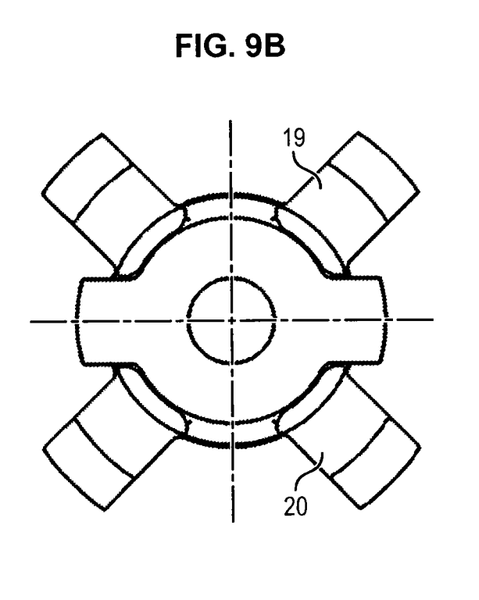
Figure 10:
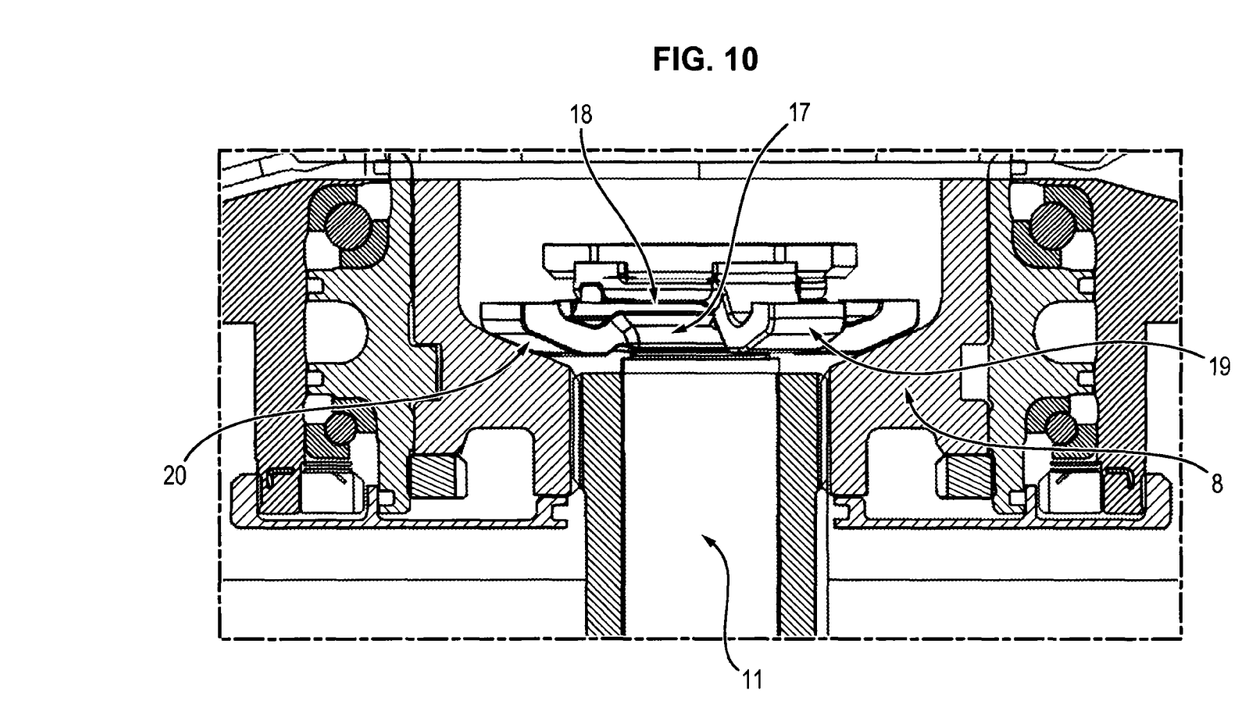
FIG. 10 is a representation of an embodiment of a holding system in which the holding arms are mounted onto a main body and extend inside a pivot.

In an embodiment, the arms are arranged at 90° to each other, so as to form a cross in top view (FIG. 9).

The mounting of the parts 17, 18 at the level of the end of the axle 11 may be realised by cooperation of the parts with at least one receiving groove 24 made in the axle 11. It is for example a circular groove.

In an embodiment, the system 1 comprises an elastic ring 27 arranged in said groove 24, so as to retain the annular parts along the axis of the main body.

In particular, thanks to this ring, it is possible to take off the parts 17, 18 of the pivot 8 without said parts falling along the axle 11, particularly during extraction steps.

In an embodiment, the end of the axle 11, intended to be inserted into the pivot 8, comprises projecting lobes 37. These lobes 37 make it possible in particular to rotate the parts 17, 18 while they are being put in place inside the pivot 8. To this end, the lobes 37 are capable of engaging on the parts. The lobes 37 also participate in the radial locking assured by the system.

In an embodiment, the axle 11 passes through, for each blade, the inside of the radial shaft, and terminates by an end that is housed in the pivot 8.

The compactness of the holding system 1 is thus further improved, since said holding system extends inside the radial shaft 23 and the pivot 8.

Figure 5A:
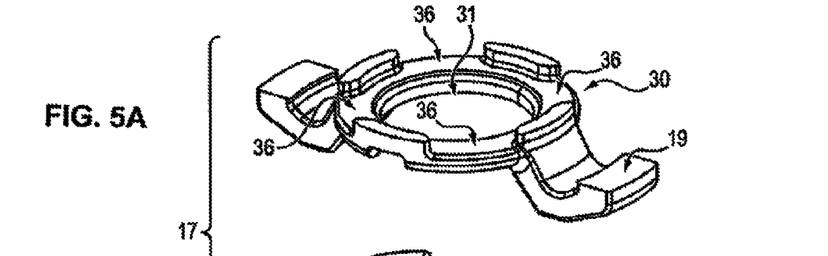
FIGS. 5A, 5B, 6A and 6B represent an embodiment of parts of the holding system.
Figure 5B:
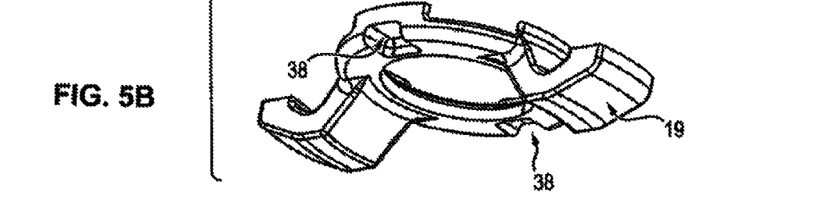
Figure 6A:
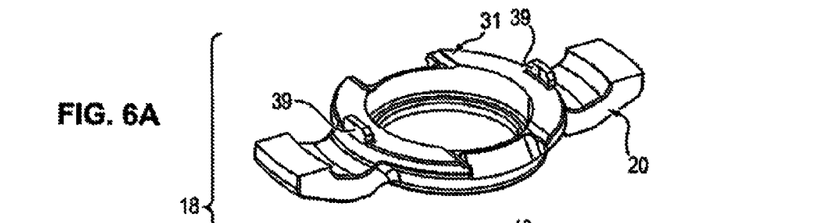
Figure 6B:
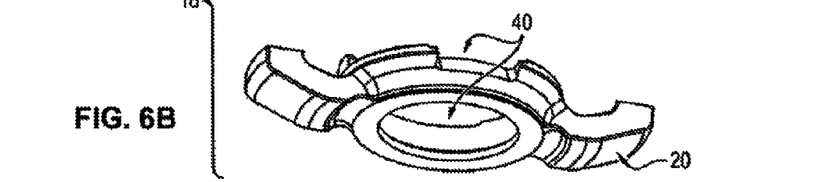
Figure 7:
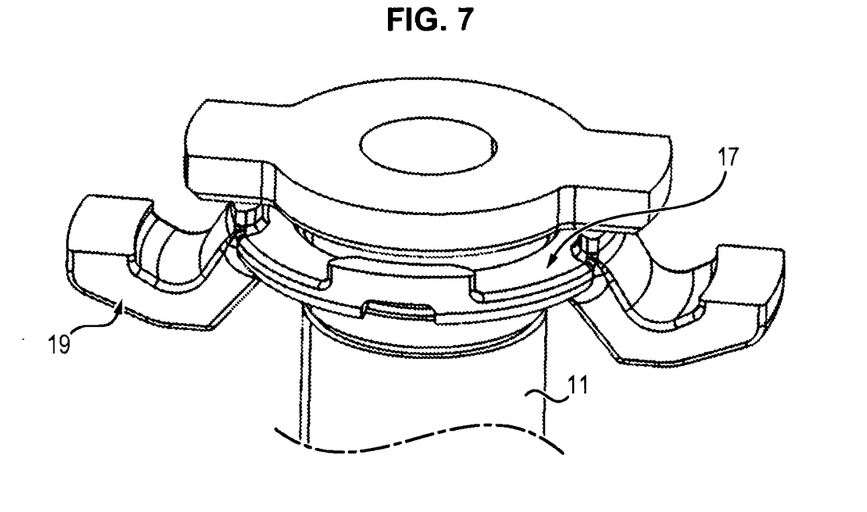
FIG. 7 represents an embodiment of the putting in place of the first part around the main body.
Figure 8:
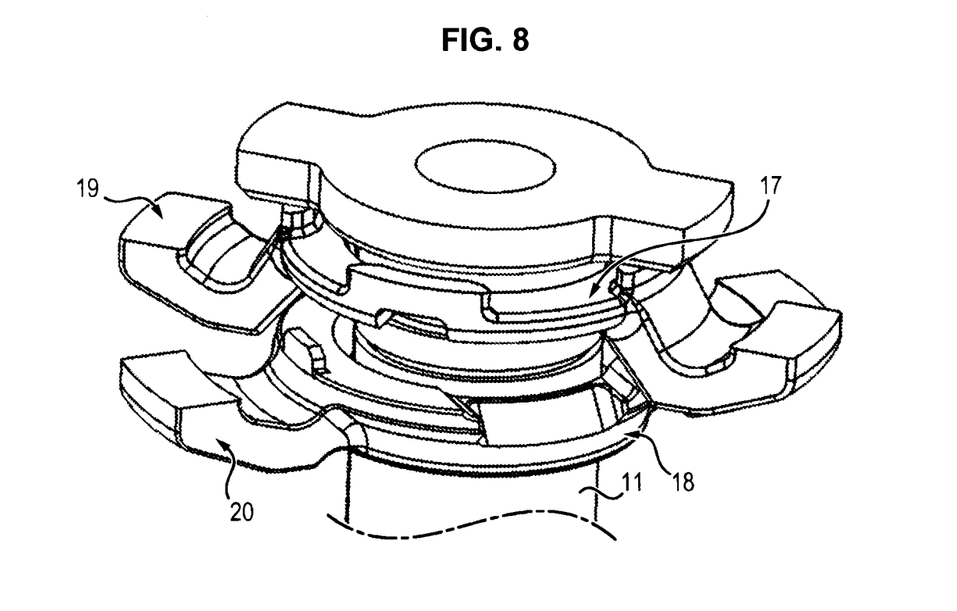
FIG. 8 represents an embodiment of the putting in place of the second part around the main body.

A particular embodiment of the parts comprising the holding arms is represented in FIGS. 5 and 6.

A first part 17 comprises an annular base 30 having a circular opening 31, of diameter slightly greater than that of the axle 11. This first part 17, is, in position inside the pivot 8, above a second part 18, along the radial axis of the fan.

The base 30 comprises at least two projecting holding arms 19.

The base 30 further comprises notches 36 on its upper face, making it possible to receive the lobes 37 of the axle 11. In FIG. 5A, the base 30 comprises four notches on its circular perimeter.

The base 30 comprises notches 38 on its lower face (FIG. 5B), which are intended to cooperate by assemblage with pins 39 projecting onto the upper face of the second part 18.

The second part 18 also has an annular base 31, at least two projecting holding arms 20, and, the aforementioned pins 39 projecting onto the upper face of the base 31 (FIGS. 6A and 6B).

The base 31 of the second part 18 has reamings 40 for the passage of the holding arms 19 of the first part 17, during the assembly of the first part and the second part inside the pivot.

Assembly

The assembly of the holding system 1 comprises, in a possible implementation, a step consisting in introducing the end of the main body and the holding arm inside the pivot 8, via openings 25, 26 provided in the pivot 8. In particular, it involves aligning the lobes 37 projecting from the main body 11 and the holding arms with said openings, so as to enable their passage inside the pivot 8.

Thus, thanks to the cooperation of these openings with the elements projecting from the holding system, it is possible to access the interior volume of the pivot 8, which is ordinarily inaccessible, which enables an increase in compactness.

In the case where the holding system 1 comprises first and second parts 17, 18, as described previously, the assembly may comprise the steps (cf. FIG. 11) consisting in:
  positioning the first structure 17 at one end of the axle 11,
    introducing (step E1) the end of the axle 11 and the first part 17 into the pivot 8, via the openings 25, 26 provided for this purpose (the lobes 37 of the axle 11 and the holding arms 19 of the first part 17 are aligned with these openings 25),
  causing a rotational movement of the first part 17 in the pivot 8 so as to free the lateral openings 25,
  introducing the second part 18 into the pivot 8 by making it slide along the axle 11, by alignment of the holding arms 20 with the lateral openings 25.

Figure 11:
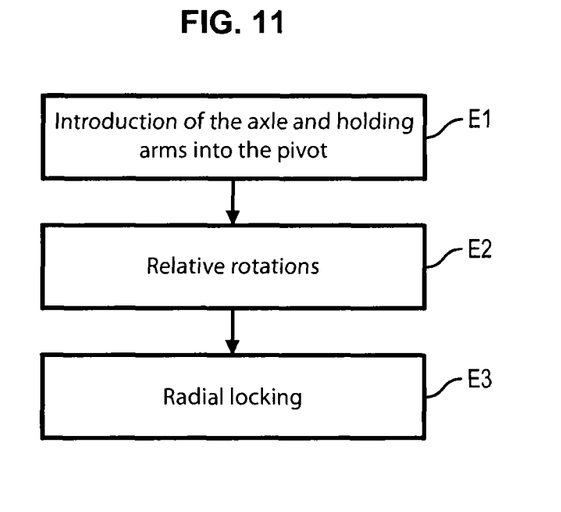
FIG. 11 is a representation of an embodiment of an assembly method according to the invention.

According to a later step E2, a relative rotation of the first part 17 with respect to the second part is produced, so as to arrange along a different direction the holding arms 19, 20 of the first part 17 and the second part 18 in the pivot 8, these arms engaging on the pivot for its radial locking (step E3).

This relative rotation may in particular be realised by rotational movement of the axle 11, which drives in rotation the parts, via the grooves 24, and via the projecting lobes 37 that interlock with one of the parts 17, 18.

The first and the second parts are then assembled inside the pivot 8 by cooperation of the notches 38 and the pins 39, as described previously.

The method of removing the holding system 1 takes place according to steps in the reverse order.

The axle 11 is moved radially (in a direction tending to move the longitudinal axis away from the fan), then undergoes a rotation making it possible to align the holding arms 20 of one of the parts 18 with the lateral openings 25 of the pivot 8. This part 18 is then removed from the pivot 8 by sliding along the axle 11.

An additional rotation makes it possible to align the holding arms 19 of the other part 17 with the lateral openings 25, as well as the lobes 37 of the axle 11 with the lateral openings 25. The assembly then undergoes a translation making it possible to extract it from the pivot 8.

The assembly and the removal of the system may be carried out manually and/or via a machine that automates these steps.

The system is thus removable via a simple and efficient assembly and removal method.

The invention claimed is:

1. A fan comprising:
   a system for holding a blade with variable pitch angle, a foot of the blade is mounted onto a radial shaft of a rotor of the fan by a pivot,
   wherein the system comprises
     a main body capable of being attached onto the rotor, and
     at least one holding arm directly mounted onto said main body and capable of extending inside the pivot so as to engage with the pivot in order to lock the movement of said pivot along an axis of the radial shaft on which the pivot is mounted, and
   wherein the main body is arranged at least partially inside the radial shaft on which the blade is mounted.

2. The fan according to claim 1, wherein the pivot comprises a central opening, and at least one lateral opening, for an insertion and an extraction of the main body and the at least one holding arm.

3. The fan according to claim 1, wherein the main body is an axle, a first end of the axle is configured to enable the first end of the axle to be introduced into the pivot and to receive at least one annular part which comprises the at least one holding and to cooperate therewith to maintain the at least one annular part in place on the axle.

4. The fan according to claim 1, further comprising a plurality of holding arms, each of the holding arms being arranged along a different direction.

5. The fan according to claim 1, further comprising at least one annular part, capable of being mounted on one end of the main body and comprising projecting holding arms.

6. The fan according to claim 5, further comprising an elastic ring,
   wherein the main body has at least one groove for receiving the at least one annular part, the elastic ring being arranged in the at least one groove so as to retain the at least one annular part along an axis of the main body.

7. The fan according to claim 3, wherein the first end of the main body comprises projecting lobes, said lobes being capable of engaging on the at least one annular part comprising the at least one holding arm so as to place the at least one annular part in rotation around an axis of the main body.

8. The fan according to claim 1, comprising a plurality of blades with variable pitch angle each having a foot, and the rotor comprising radial shafts, the feet of the blades being mounted onto the radial shafts by pivots.

9. A turbine engine comprising:
   a fan according to claim 8,
   wherein the blades belong to two contra-rotating propellers.

10. A method of assembling a holding system of a fan according to claim 1, the method comprising:
    introducing an end of the main body and the at least one holding arm inside the pivot via openings provided in the pivot; and
    engaging the at least one holding arm on the pivot.

11. The method of assembling a holding system of a fan according to claim 10, wherein the holding system comprises a first part and a second part, each of the first part and the second part comprising holding arms, and wherein said method further comprises producing a relative rotation of the first part with respect to the second part inside the pivot, so as to arrange along a different direction the holding arms of the first part and the second part inside the pivot.

* * * * *

UNITED STATES PATENT AND TRADEMARK OFFICE
CERTIFICATE OF CORRECTION

PATENT NO. : 9,903,375 B2
APPLICATION NO. : 14/430729
DATED : February 27, 2018
INVENTOR(S) : Olivier Belmonte et al.

Page 1 of 1

It is certified that error appears in the above-identified patent and that said Letters Patent is hereby corrected as shown below:

In the Specification

Column 5, Line 44, change "second part is produced" to --second part 18 is produced--;

In the Claims

Column 6, Line 30, change "one holding and" to --one holding arm and--; and

Column 6, Line 36, change "one annular part, capable" to --one annular part capable--.

Signed and Sealed this
Sixth Day of August, 2019

Andrei Iancu
*Director of the United States Patent and Trademark Office*